(12) United States Patent
McDermott

(10) Patent No.: US 8,348,464 B2
(45) Date of Patent: Jan. 8, 2013

(54) GRAVITY CONTROLLED LIGHTING DEVICE

(76) Inventor: Kevin F. McDermott, Rockledge, FL (US)

( * ) Notice: Subject to any disclaimer, the term of this patent is extended or adjusted under 35 U.S.C. 154(b) by 638 days.

(21) Appl. No.: 12/423,183

(22) Filed: Apr. 14, 2009

(65) Prior Publication Data

US 2010/0259199 A1   Oct. 14, 2010

(51) Int. Cl.
*F21S 4/00* (2006.01)

(52) U.S. Cl. ............... 362/249.12; 362/190; 362/191; 362/236; 362/249.13; 362/276

(58) Field of Classification Search .................. None
See application file for complete search history.

(56) References Cited

U.S. PATENT DOCUMENTS 5,161,879 A * 11/1992 McDermott .................. 362/206
6,305,819 B1 * 10/2001 Chen ............................ 362/186
6,486,797 B1 * 11/2002 Laidman .................... 340/908.1

OTHER PUBLICATIONS www.turboflare360.com, Jul. 10, 2009.
www.pflare911.com, Jul. 10, 2009.
www.galls.com →click on FireAuthority.com Tab (at top) →click on Traffic Safety (on lefthand side) →click on Traffic Control Equipment., Jul. 10, 2009.
www.nationalsafetyinc.com, Jul. 10, 2009.
www.emergencyroadflares.com, Jul. 10, 2009.

* cited by examiner

*Primary Examiner* — Diane Lee
*Assistant Examiner* — Sean Gramling
(74) *Attorney, Agent, or Firm* — Lowe, Hauptman, Ham & Berner, LLP

(57) ABSTRACT

A lighting device having a housing incorporating an electrical circuit, a light source and a source of power with a gravity controller. The gravity controller regulates the power applied to the light source in response to the relationship between the position angle and the tilt angle of the lighting device with respect to the vertical. The lighting device has a storage orientation wherein the light source is non-energized and a transporting or use orientation wherein the light source is energized. A plurality of lighting devices are mounted on a storage bracket in a non-energized orientation. A plurality of lighting devices are mounted on a carrier having a changeable orientation, wherein the lighting devices are energized during transporting and non-energized during storage.

14 Claims, 8 Drawing Sheets

GRAVITY CONTROLLED LIGHTING DEVICE

BACKGROUND OF THE INVENTION

1. Field of Invention

Figure 1:
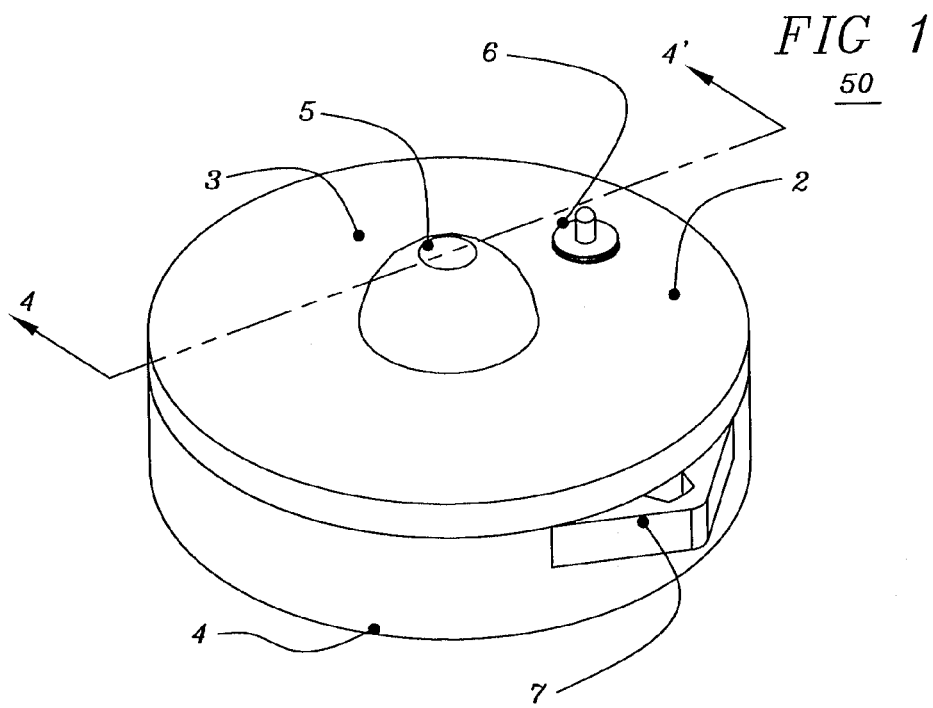

This invention relates to a lighting device used primarily as a warning device or road flare. The device is normally stored in the trunk of an emergency vehicle until it is needed to alert oncoming drivers of a hazard in the road. It is commonly used by first responders such as policeman or fireman however it can be used by private citizens as well. In an emergency the user removes the light from his vehicle and places it in the road to signal to approaching vehicles the fact that a hazard exists. It is common practice for several of these devices to be placed in the roadway forming a wedge to guide approaching vehicles around the hazard.

2. Prior Art

Prior art includes electric lights employed to identify road hazards. These include lights mounted on barricades, or on plastic cones. These electric lights are usually positioned from two to four feet above the roadway. They are bulky and are too large to store within the limited space available on many emergency vehicles. In addition if struck by an oncoming vehicle they can damage the vehicle or, if projected through the air, strike a first responder.

Prior art also includes smaller electric lights that are placed directly on the road. They have a low center of gravity and a base dimension to height quotient or ratio stability exceeding 1.0. They are designed to be run over by oncoming vehicles without sustaining damage or being projected by an impinging vehicle towards a first responder. These small electric lights often replace incendiary road flares because they avoid the hazards created by pyrotechnic devices. They are commonly stored within a hard opaque plastic case or fabric pouch in groups of four to eight. When needed they are removed from the case, switched "ON" and placed on the roadway. The fabric pouches usually include a shoulder strap permitting the first responder to sling it over his shoulder and carry the group of flares while placing them in a wedge formation a substantial distance before the obstruction.

Prior art also includes designs having a magnet glued into a cavity in their base permitting the flare to be attached to the top of a disabled vehicle.

Prior art also includes trunk lights permanently attached to the vehicle and activated by a switch as the trunk is opened. These are permanently attached to the vehicle.

Prior art further includes marine distress lights with a gravity switch that activates them when they are upright floating in water. These lights are usually unstable on land.

Prior art includes devices having a stability ratio exceeding 1.0 and a center of gravity less than two inches from a horizontal road. However the prior art does not add the gravity power controller to these design features.

OBJECTS AND ADVANTAGES

The objects and advantages of the present invention are to improve upon the safety of the prior art lighting devices including electric road flares.

Unlike prior art which functions solely as a road flare the lighting device of the present invention additionally automatically protects the first responder and his vehicle. The process of deploying and retrieving road flares is dangerous. The procedure includes locating the flares within the vehicle, opening the fabric pouch and slinging it over the responders shoulder. Next while walking towards traffic the first responder must turn "ON" and deploy the first flare. This is repeated for each of the flares in the pouch. This procedure is reversed when retrieving the flares. This procedure becomes difficult and time consuming if the first responder has large gloves or if the weather is cold or wet.

During this procedure the first responder is vulnerable as he is on foot and he is unlighted. Often there are emergency vehicles on the scene. However the powerful emergency vehicle lights can become a hazard because they frequently blind advancing drivers making it difficult for oncoming drivers to see the first responder in the roadway deploying flares. Therefore minimizing the time spent by first responders setting up flares will reduce accidents. Illuminating first responders as they deploy flares will reduce accidents. Finally providing illumination at the vehicle as the first responder opens his trunk looking for his flares will reduce accidents.

The present invention protects the first responder by reducing the time required to locate, deploy and retrieve the flares. In addition it provides illumination for the first responder as he removes the flares from storage, transports, deploys and retrieves them.

The present invention uses a gravity switch or a gravity power controller in combination with a storage orientation system to automatically extinguish the flares as they are put into storage. The storage orientation system can be either a powerful magnet, a storage case or a carrying case with each of the options storing the light so it is automatically extinguished.

The present invention also includes a transportation system for holding the lights in a position which "closes" the gravity switch and therefore energizes the light source making the light a powerful warning device protecting the first responder as he deploys and retrieves the lights. The transportation system can be a lanyard passing through an adapter on the lighting device or a carrying case.

The gravity switch automatically turns the lighting device or flare of the present invention "ON" throughout the deployment and keeps it "ON" until it is returned to storage at which time it automatically turns it "OFF". The referred prior art does not teach or address the following concepts which are employed in the current invention.

Employing a gravity power controller in the circuit of the lighting device to:
- have the lighting device automatically turn "ON" as it is removed from storage thereby avoiding time delays that result from locating and activating a switch
- have the lighting device illuminating and protecting the first responder as he transports and deploys it
- have the lighting device illuminating and protecting the first responder as he retrieves it
- have the lighting device automatically and instantly turn "OFF" as it is placed in storage avoiding the time delays that result from locating a switch The present invention is operational even if a first responder has large gloves which would make a manual switch difficult to activate even after it is located.

The present invention also serves to protect vehicles that do not have their own emergency lights as it can be configured to illuminate whenever the trunk is open. In addition the fact that the optics of the lighting device can optionally concentrate the emerging light about the horizontal makes it possible to customize the trunk mount configuration to meet a variety of user needs. For example, the lighting device can be mounted such that the concentrated light beam emerges horizontally from the open trunk. This is appropriate for some highway patrol cars which need powerful trunk lights. Other users may not wish to have a powerful light but still desire some light. This is achieved by having the lighting device activate and emit light but not be horizontal with the trunk open. Finally, some users may wish for the light to remain "OFF" until it is removed from the trunk. This is also possible with the proper gravity power controller configuration.

The present invention can also function as an emergency beacon to signal distress such as during a holdup. In this use the lighting device will automatically illuminate when turned from upside down to upright eliminating the need to find and activate a switch saving time which can be critical in a time of stress.

The present invention can also function without an external switch. An external switch adds to the cost of the lighting device and reduces its reliability The present invention incorporates a gravity power controller switch in combination with a low center of gravity and a nominal large base dimension to height quotient or stability ratio exceeding 1.0. The gravity switch would be problematic if employed in a lighting device which was not highly stable. An unstable lighting device could easily be blown over by the wind or passing vehicles causing it to turn "OFF".

The present invention includes a light transmitting carrying case having openings or slots which transmit light from a plurality of lighting devices towards advancing vehicles.

The present invention employs a rotational movement of the carrying case to automatically activate a plurality of lighting devices contained therein.

The present invention includes a storage bracket which holds the lighting devices in an "OFF" orientation while they are not in use. The storage bracket permits easy removal of the lighting devices when they are needed.

The present invention includes a disable switch for disabling the gravity power controller making the lighting device easily adaptable for both gravity controlled and non-gravity controlled tasks.

The present invention includes a main switch capable of overriding the gravity power controller making the lighting device more versatile and capable of more tasks.

Further objects and advantages are realized through combinations of the above distinct advantages.

SUMMARY

In accordance with the present invention a portable lighting device comprising a gravity power controller regulates the energy applied to a light source by a source of electric power to establish its intensity. The gravity power controller responds to a change in the angular orientation of the lighting device relative to a vertical such as vertical line or vertical plane by increasing or reducing the energy supplied to the light source. The configuration of the gravity switch is selected to interact with the storage, transporting and use orientations of the lighting device to assure that the lighting device is illuminating at beneficial times. When employed as a road flare the storage orientation and gravity power controller configuration interact to keep the lighting device "OFF". The transportation and deployment orientations interact with the gravity power controller to keep the lighting device "ON". This invention requires the design parameters relating to use, storage, transportation and gravity to cooperate to create the needed illumination appropriate for that task. In the case where the lighting device is employed as a road flare the present invention minimizes the flare deployment and retrieval time, provides a warning light for the emergency vehicle and illuminates the first responder while he carries the lighting device. A light transmitting carrying case holds a plurality of the lighting devices and activates them simultaneously as it is rotated upright. It then transmits the light they emit to warn oncoming drivers that a first responder is in the roadway.

These and other objects of the present invention will become apparent from a reading of the following specification, taken in conjunction with the enclosed drawings.

DRAWINGS

Figures

Figure 2:
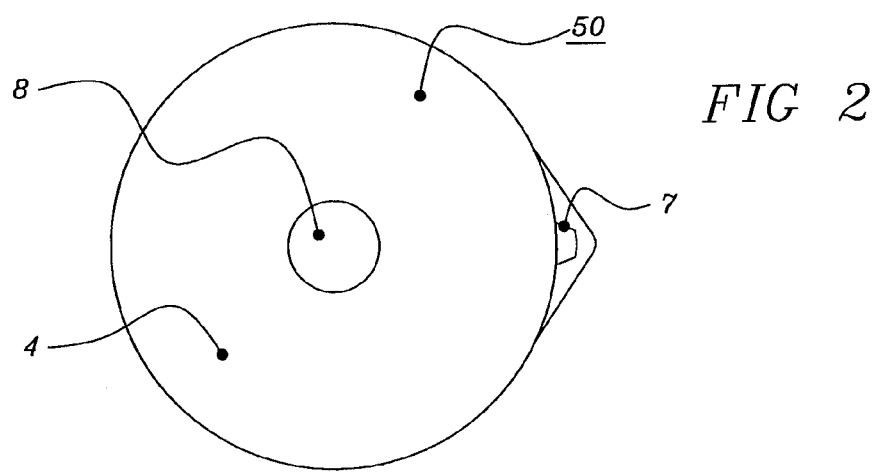
Figure 3:
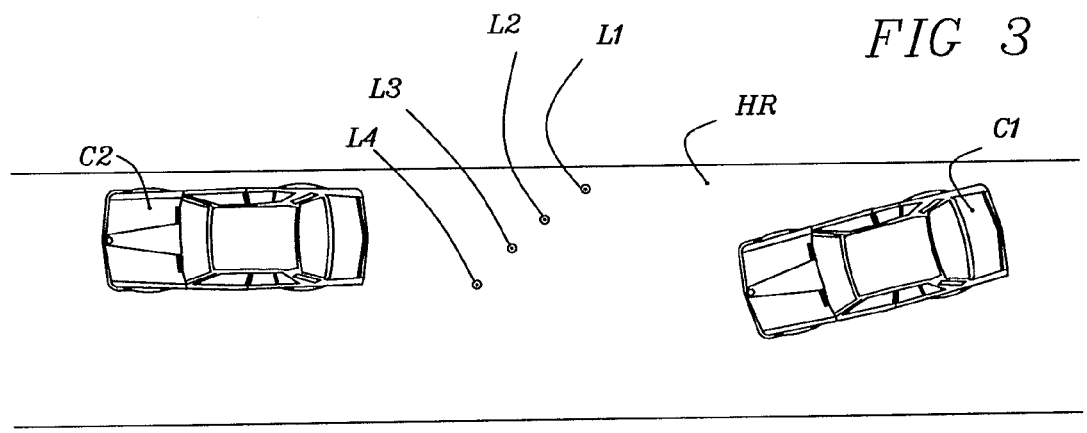
Figure 4:
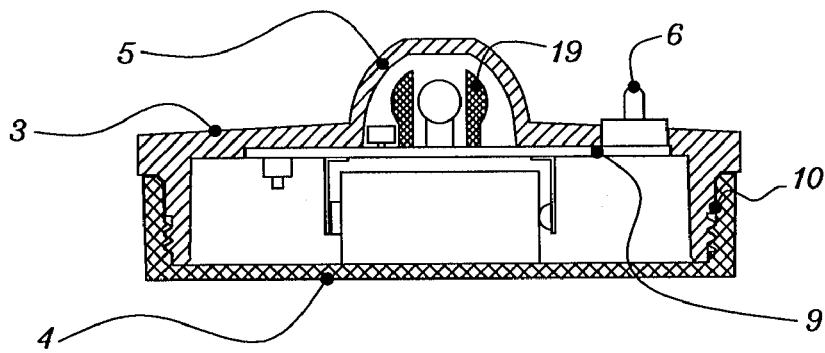
Figure 5:
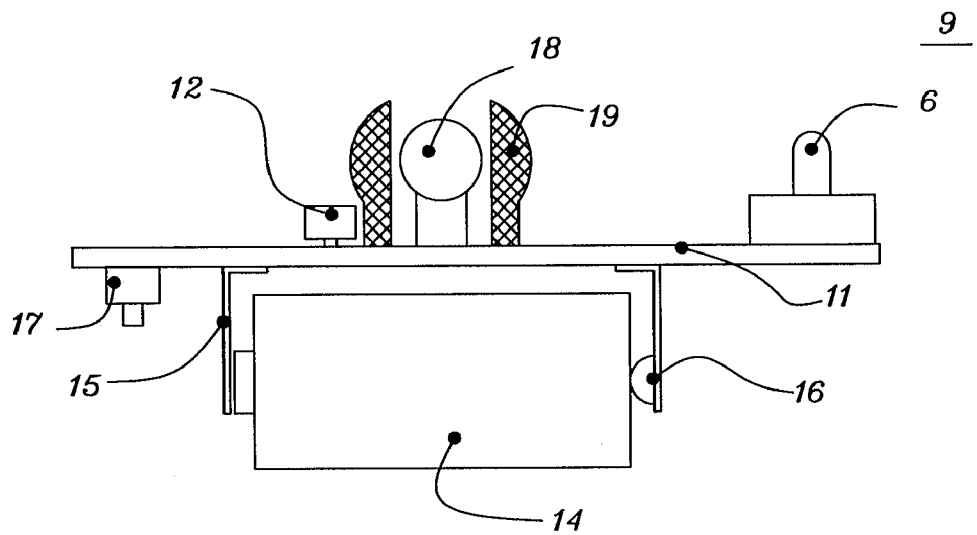
Figure 6:
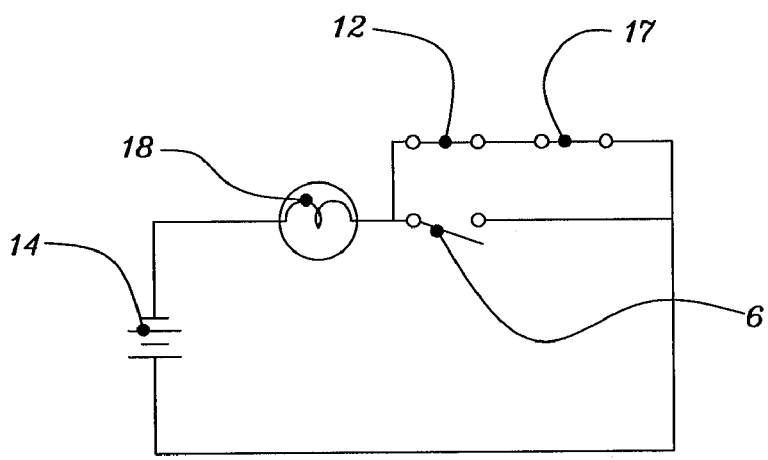
Figure 7:
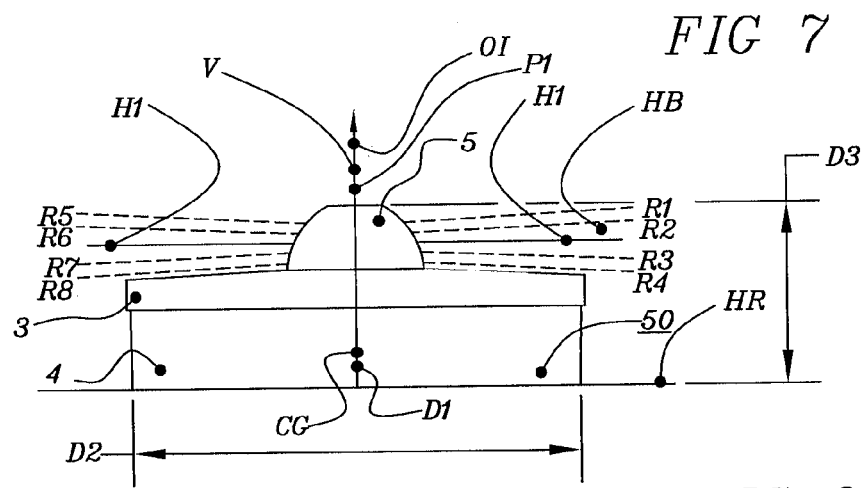
Figure 8:
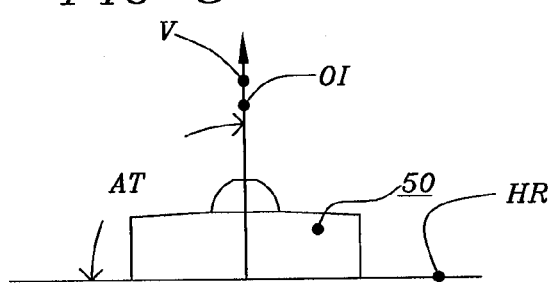
Figure 9:
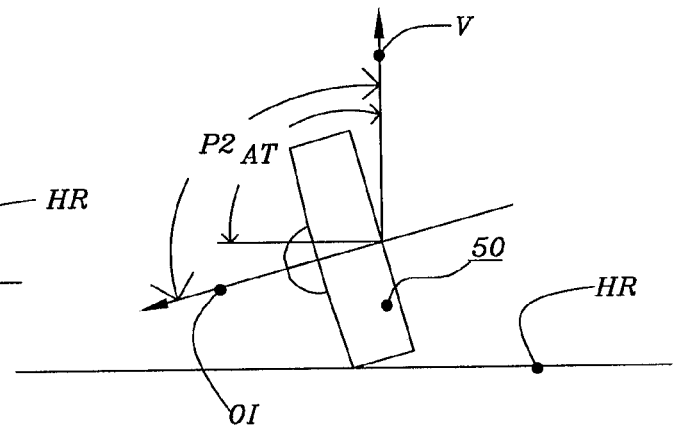
Figure 10:
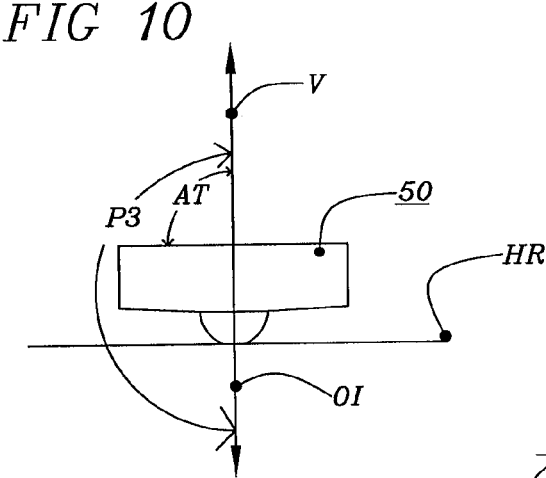
Figure 11:
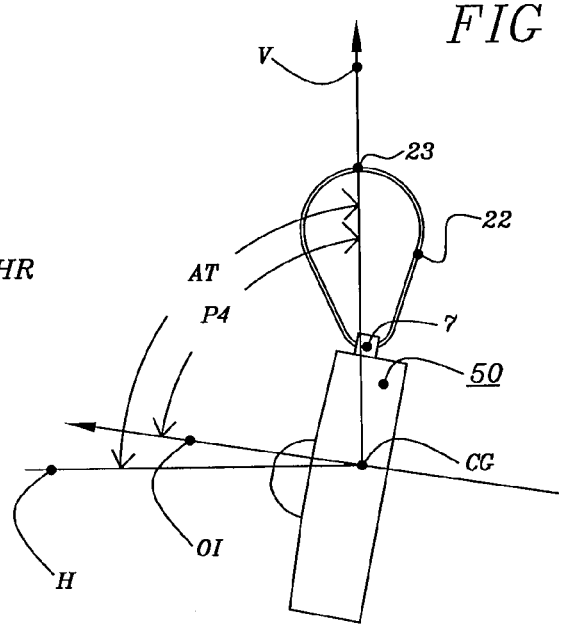
Figure 12:
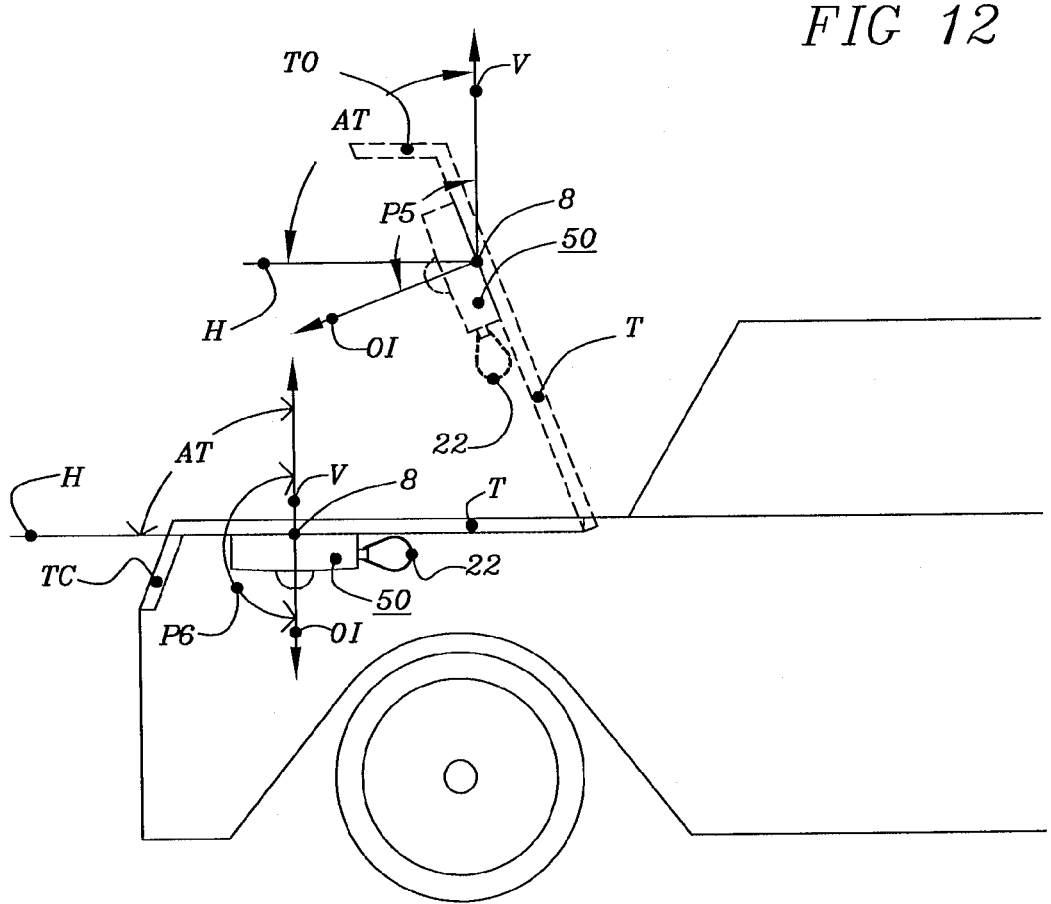
Figure 13:
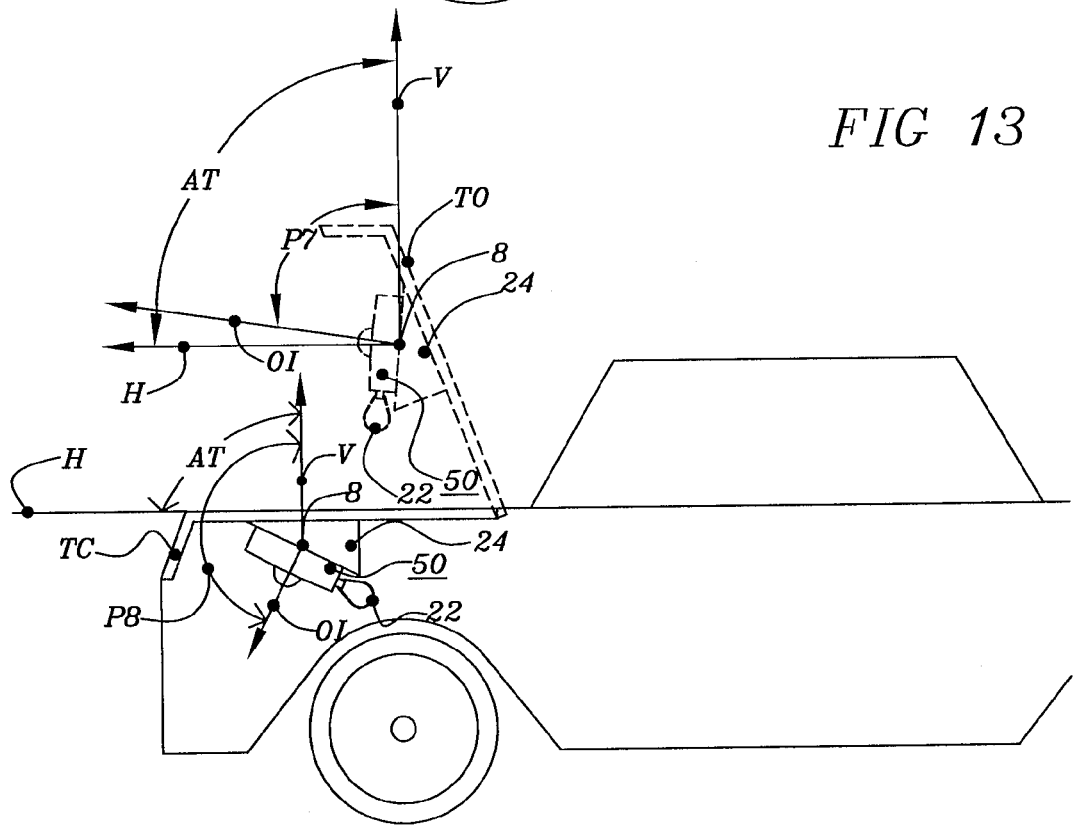
Figure 14:
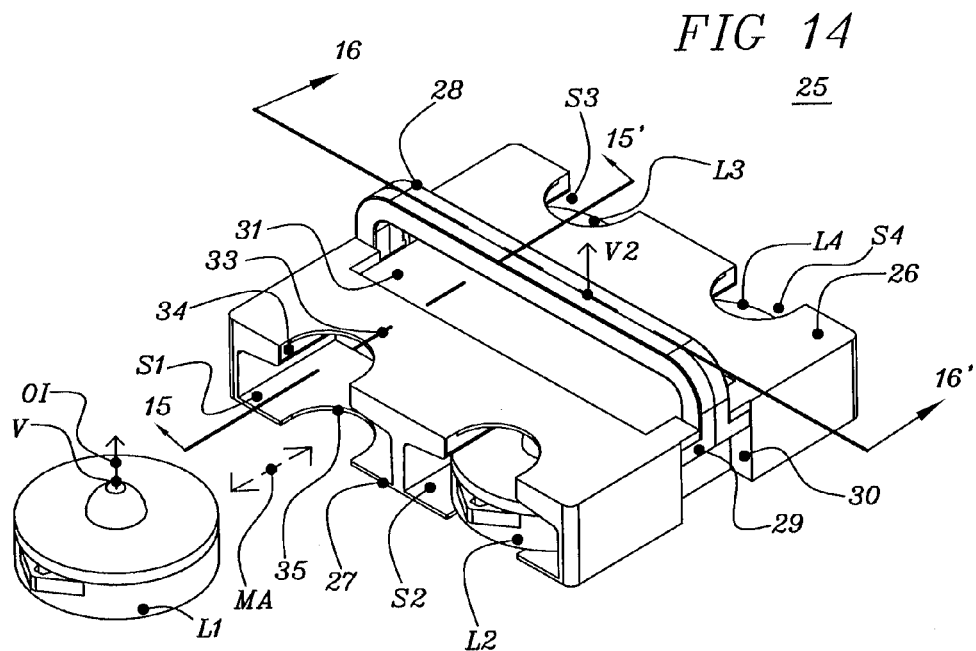
Figure 15:
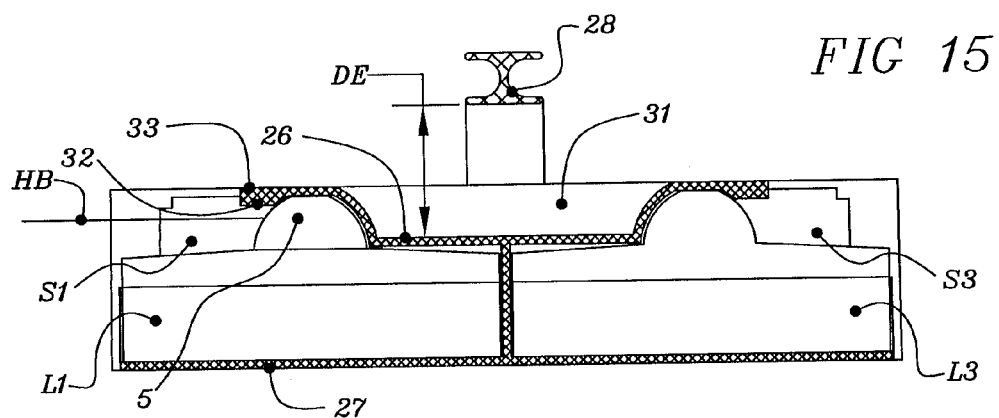
Figure 16:
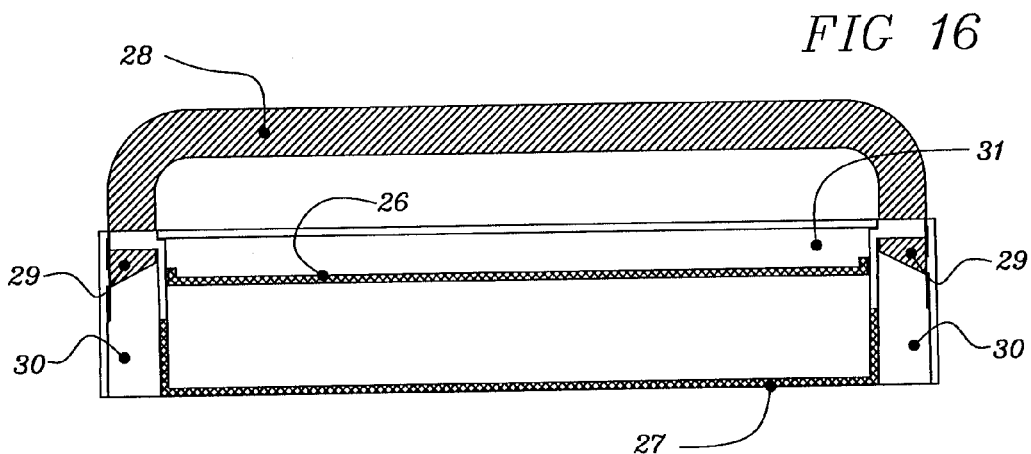
Figure 17:
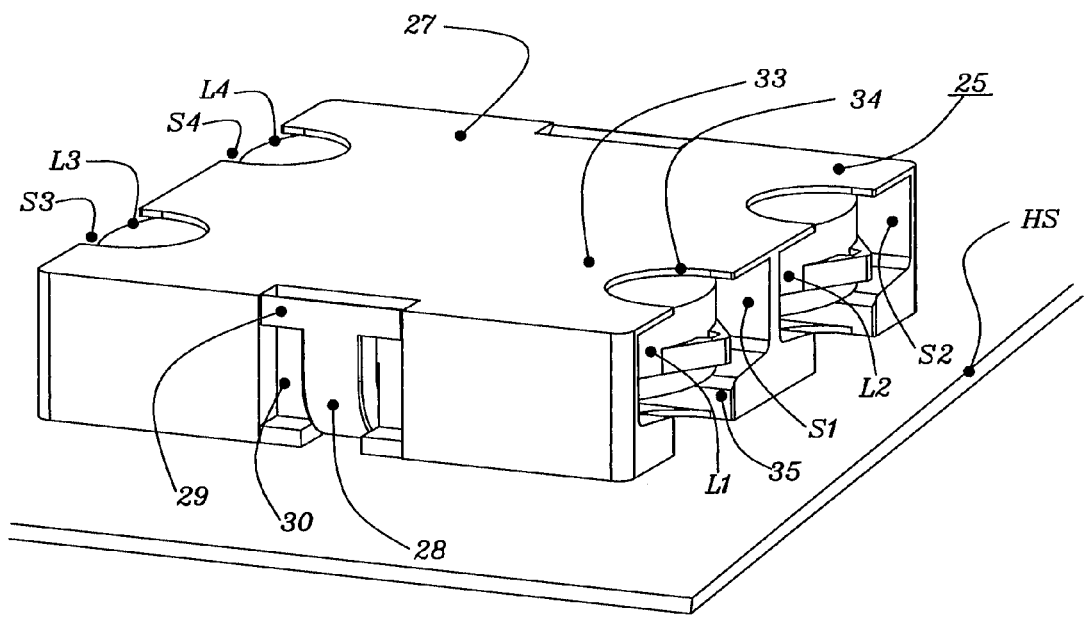
Figure 18:
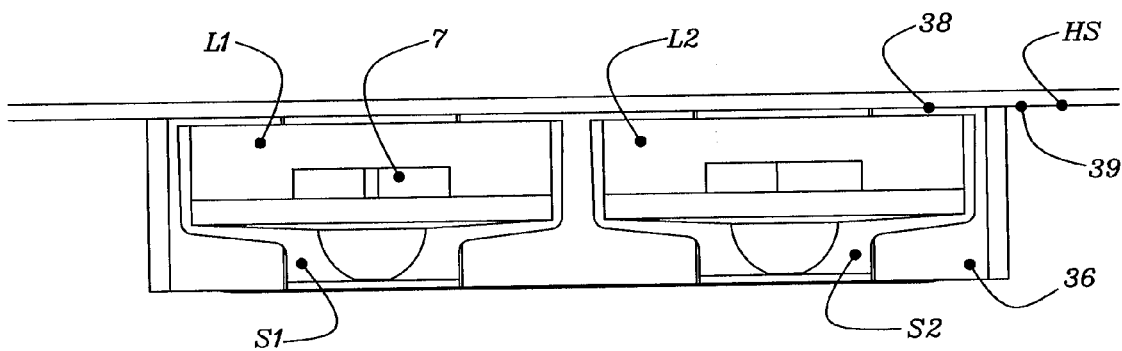
Figure 19:
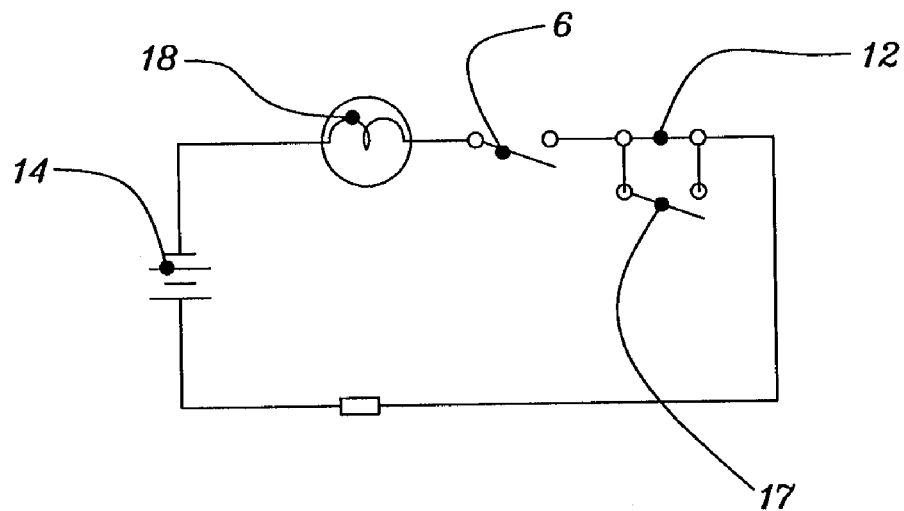
Figure 20:
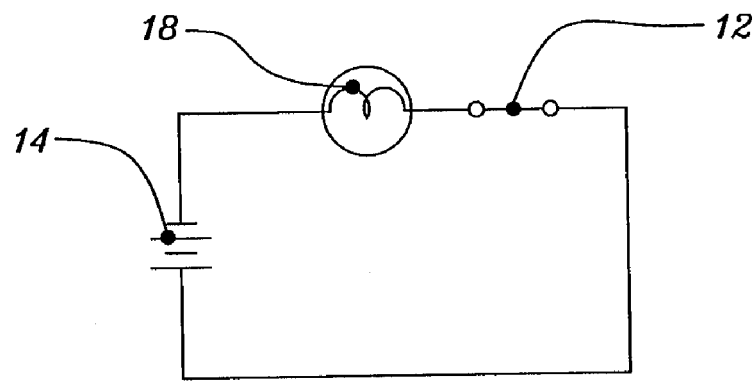
Figure 21:
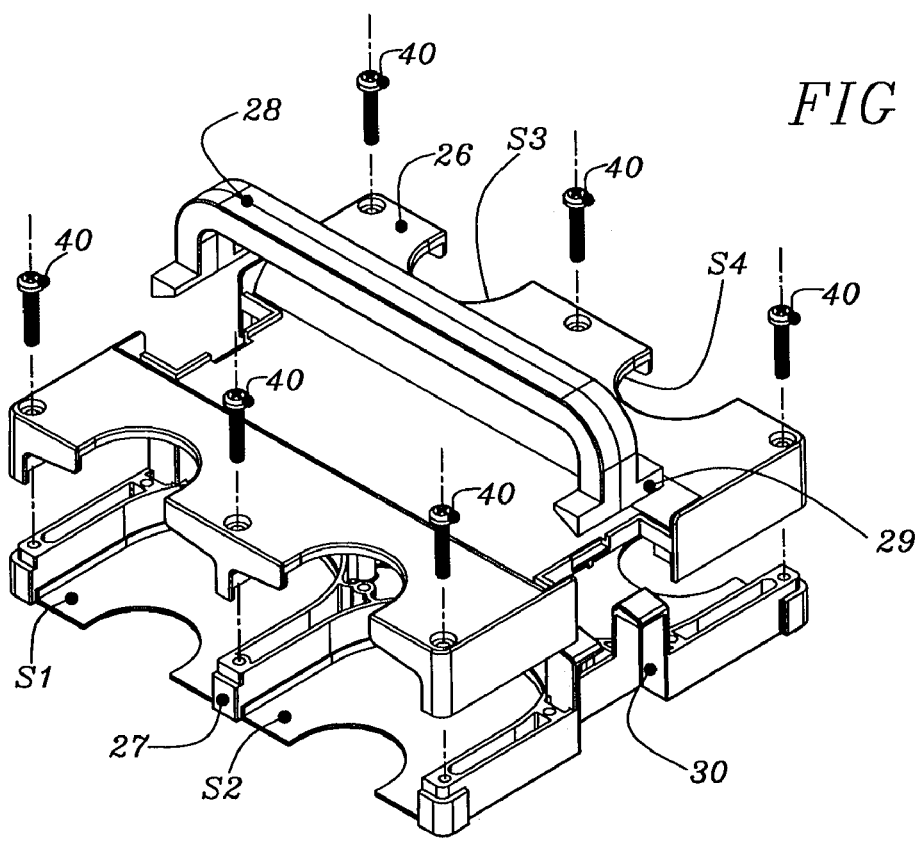
Figure 22:
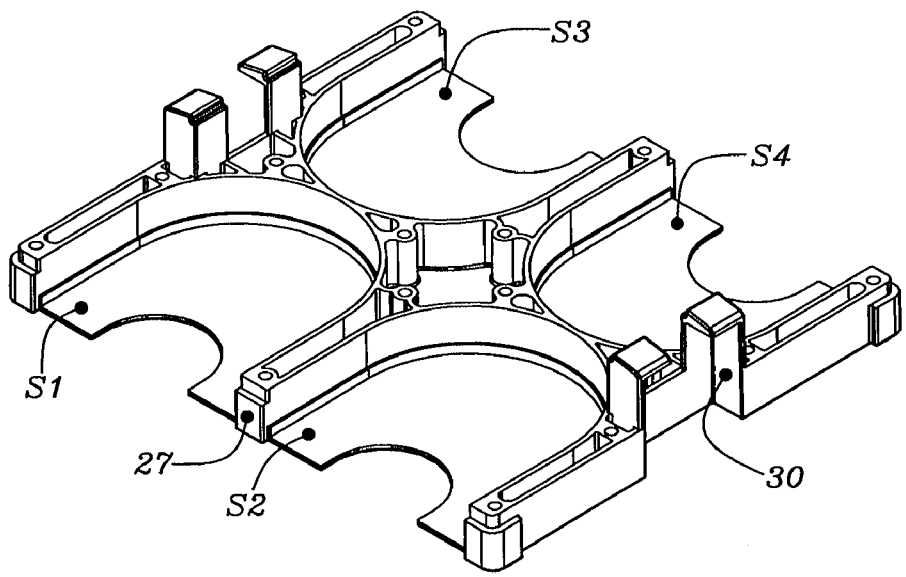

FIG. 1 is a perspective view of the lighting device
FIG. 2 is a bottom view of the lighting device
FIG. 3 is a top view of a typical road hazard scene
FIG. 4 is a partial cross-section across line 4-4 of FIG. 1
FIG. 5 is a view of a circuit removed from FIG. 4
FIG. 6 is a schematic of the electric circuit
FIG. 7 is a diagrammatic front view of the lighting device standing on horizontal road
FIG. 8 is a front view of the lighting device at a first angular position
FIG. 9 is a front view of the lighting device at a second angular position
FIG. 10 is a front view of the lighting device at a third angular position
FIG. 11 is a front view of the lighting device being held by a lanyard
FIG. 12 shows the lighting device attached with a magnet to the trunk of a vehicle
FIG. 13 is similar to FIG. 12 except a metal bracket has been added to the trunk
FIG. 14 shows four lighting devices removably assembled into a carrier 25 for transporting
FIG. 15 is a partial cross-sectional view taken across line 15-15 of FIG. 14
FIG. 16 is a partial cross sectional view taken across line 16-16 of FIG. 14
FIG. 17 shows the carrier of FIG. 14 upside down resting on top of a shelf for storage
FIG. 18 shows a storage bracket 36 holding four lights attached to the underside of a shelf for storage
FIG. 19 is a schematic of an alternate electric circuit which can be used in place of that shown FIG. 6
FIG. 20 is a schematic of a second alternate electric circuit which can be used in place of that shown in FIG. 6
FIG. 21 is an assembly view of the carrier of FIG. 14
FIG. 22 is a view of carrier bottom 27 removed from FIG. 21

| DRAWINGS | |
|---|---|
| Reference Letters | |
| AT | Tilt Angle |
| C1 | Obstructing Car |
| C2 | Approaching Car |
| CG | Center of Gravity |
| D1 | Distance One |
| D2 | Base Dimension |
| D3 | Height |
| DE | Extended Distance |
| H1 | Horizontal |
| HB | Horizontal Light Beam |
| HR | Horizontal Road |
| HS | Horizontal Shelf |

-continued

| | DRAWINGS |
|---|---|
| L1 | Lighting Device 1 |
| L2 | Lighting Device 2 |
| L3 | Lighting Device 3 |
| L4 | Lighting Device 4 |
| MA | Movement Arrow |
| OI | Orientation Indicator |
| P1 | Position One Angle |
| P2 | Position Two Angle |
| P3 | Position Three Angle |
| P4 | Position Four Angle |
| P5 | Position Five Angle |
| P6 | Position Six Angle |
| P7 | Position Seven Angle |
| P8 | Position Eight Angle |
| R | Stability Ratio |
| R1 | Light Ray 1 |
| R2 | Light Ray 2 |
| R3 | Light Ray 3 |
| R4 | Light Ray 4 |
| R5 | Light Ray 5 |
| R6 | Light Ray 6 |
| R7 | Light Ray 7 |
| R8 | Light Ray 8 |
| S1 | Slot One |
| S2 | Slot Two |
| S3 | Slot Three |
| S4 | Slot Four |
| T | Trunk |
| TC | Trunk Closed Position |
| TO | Trunk Open Position |
| V | Vertical |
| V1 | Vertical One |
| V2 | Vertical Two |
| | Reference Numerals |
| 1 | |
| 2 | housing |
| 3 | cover |
| 4 | base |
| 5 | window |
| 6 | main switch |
| 7 | adapter |
| 8 | magnet |
| 9 | circuit |
| 10 | thread |
| 11 | circuit board |
| 12 | gravity power controller |
| 13 | longitudinal axis |
| 14 | power supply |
| 15 | positive contact |
| 16 | negative contact |
| 17 | disable switch |
| 18 | light source |
| 19 | optic |
| 20 | loop |
| 21 | |
| 22 | lanyard |
| 23 | holding location |
| 24 | bracket |
| 25 | carrier |
| 26 | carrier top |
| 27 | carrier bottom |
| 28 | handle |
| 29 | wings |
| 30 | tracks |
| 31 | recess |
| 32 | catch |
| 33 | flex location |
| 34 | top cut-out |
| 35 | bottom cut-out |
| 36 | storage bracket |
| 37 | flasher module |
| 38 | storage bracket bottom |
| 39 | surface |
| 40 | self threading screws |
| 50 | lighting device |

OPERATIONAL DESCRIPTION OF THE PREFERRED EMBODIMENT FIGS. 1-20

Lighting device 50 of FIGS. 1 through 20 is the preferred embodiment of the present invention. Looking at FIGS. 1 through 20 lighting device 50 is cylindrical shaped low profile portable lighting device comprising housing 2. Housing 2 includes cover 3 and base 4 which permits lighting device 50 to remain stable and upright when placed on a flat surface such as a horizontal road. Base 4 is usually constructed of a tough plastic and optionally includes powerful magnet 8 glued into a molded cavity. Magnet 8 is employed so that lighting device 50 can be attached to metallic surfaces. Housing 2 further includes adapter 7 usually molded as part of base 4 which serves to secure a lanyard other device for holding and transporting lighting device 50. Cover 3 usually constructed of a transparent plastic includes window 5 to be later described for transmitting light. Cover 3 also permits access to main switch 6.

FIG. 3 is a top view of a typical use for lighting device 50 on a horizontal road HR where obstructing car C1 is inoperable and lighting devices L1, L2, L3 and L4 similar to lighting device 50 are placed in a wedge formation to direct approaching car C2 safely around. Lighting device 50 is constructed with a wide base, low profile and low center of gravity so that it can withstand accidental run over by approaching vehicles without damage and without being knocked down from its standing position.

FIG. 4 is partial cross-section taken across line 4-4[1] of FIG. 1. In FIG. 4 cover 3 is removably threaded onto base 4 at thread 10. Circuit 9 is affixed, using adhesive or fasteners, to the underside of cover 3 with main switch 6 protruding through cover 3 making it accessible from the exterior of lighting device 50.

FIG. 5 is circuit 9 removed from FIG. 4. FIG. 6 is a schematic of circuit 9. Circuit 9 includes circuit board 11, connecting light source 18, main switch 17, power supply 14, positive contact 15 and negative contact 16, as shown in the FIG. 6 schematic. Light source 18 and power supply 14 of circuit 9 are matched in characteristics to provide a desired intensity and operating life. This selection of circuit characteristics is common design practice. Gravity power controller 12 is a switch that is "ON" when positioned upright as shown in FIG. 5 but which automatically turns "OFF" when rotated past a tilt angle AT having a magnitude of approximately 90 degrees. The tilt angle AT can vary with alternate gravity power controller 12 designs.

The schematic of FIG. 6 applies to circuit 9 of lighting device 50. In the upright orientation of FIG. 4 with the schematic configuration of FIG. 6 lighting device 50 would be "ON" because gravity power controller 12 of FIG. 5 is in an upright angular position making it a "closed circuit" conducting electricity. In this upright position lighting device 50 is "ON" emitting light because electricity flows from power supply 14 through override switch 17, through gravity power controller 12 and light source 18. Light source 18 is being supplied sufficient energy to create a first intensity adequate to satisfy the needs of the task at hand. The actual intensity of emitted light can be controlled by an appropriate selection of the characteristics of light source 18 and power supply 14. The supply of energy to light source 18 is regulated by gravity power controller 12. If lighting device 50 is turned upside down—rotated 180 degrees—gravity power controller 12 will "open circuit" and reduce the energy supplied to light source 18 to zero. This will reduce the intensity of emitted light to zero and lighting device 50 will be "OFF". If it is required by specification the intensity can be reduced to a lower level but not to zero. This can be achieved by conventional design means by modifying the FIG. 6 circuit. Power supply 14 can be any one of a variety of sources of electrical power including a battery or a capacitor. Power supply 14 is a battery with longitudinal axis 13 approximately parallel to a horizontal road HR to be later described.

The schematic of FIG. 6 shows main switch 6 in an "open circuit" or "OFF" position. As previously described lighting device 50 will illuminate even when main switch 6 is "OFF" because energy is supplied to light source 18 through gravity power controller 12. However if main switch 6 is moved to a closed "ON" position then lighting device 50 will turn "ON" regardless of the angular position of gravity power controller 12 or the angular orientation of lighting device 50. Main switch 6 is used whenever it is desirable to have lighting device 50 be "ON" regardless of its orientation.

The prior discussion regarding the operation of lighting device 50 has been based upon FIG. 6 wherein disable switch 17 is "closed" Disable switch 17 can also be "opened" and this will disable gravity power controller 12. If disable switch 17 is "open" lighting device 50 will have its "OFF" and "ON" determined solely by the "OFF-ON" position of main switch 6. In this instance the angular orientation of lighting device 50 will have no effect on its intensity. Disable switch 17 is shown as a typical "ON-OFF" switch however, it can be a simple jumper wire or screw on circuit board 11. It is noteworthy to realize that there are many uses for lighting devices that are gravity controlled and other uses that should not include gravity control. Organizations do not wish to purchase a variety of lighting devices to satisfy the variety of uses. The present invention in disclosing a gravity power controller 12, a main switch 7 and a disable switch 17 shows how one lighting device can satisfy a variety of needs.

Looking back at FIGS. 4 and 5 circuit 9 has optic 19 attached using adhesive or other means to circuit board 11. Optic 19 is shown as a cross-section. Optic 19 is a classical cylindrical plano convex lens which encircles lamp 18 and concentrates its emitted light towards the horizontal. Light emitted by light source 18 is concentrated about horizontal H1 by optic 19. The concentrated light then passes through window 5 of cover 3. Window 5 is disclosed as a transparent portion of transparent cover 3. For some designs the window would only represent an opening in housing 2 or other pathway for the light to emerge. Optic 19 is shown as a cylindrical plano convex lens but it can be of other optical designs such as a catadioptic lens or a reflector any of which can also be acceptable depending upon the exact requirements for the light output of lighting device 50. Optic 19 could also be configured to concentrate the light from light source 18 towards a direction other than horizontal H1 depending upon the exact requirements of lighting device 50. Light source 18 is shown as an incandescent lamp, however other light sources can also be acceptable depending upon the exact performance requirements for lighting device 50. Also optic 19 is shown as a component separate from cover 3 or window 5. However for some optical designs it is possible to reshape window 5 to incorporate optic 19. Looking at FIG. 7 light emerging from window 5 is represented as horizontal light beam HB composed of light rays R1, R2, R3, R4, R5, R6, R7 and R8 which are about horizontal H1 and throughout the azimuth.

FIG. 7 also shows center of gravity CG of lighting device 50 a distance D1 from horizontal road HR. Distance D1 should not exceed two inches if lighting device 50 is to remain stable and upright during wind surges created by speeding vehicles and throughout vehicle run over. Nominal large base dimension D2 is the base diameter for the present embodiment but for alternate designs it would be an average large dimension. Height dimension D3 represents the height of lighting device 50. The stability ratio R is base dimension D2 divided by height dimension D3. The stability ratio R exceeds 1.0 in order to further improve the stability of lighting device 50.

FIGS. 8 through 10 disclose the gravity controlled functioning of lighting device as it is rotated counter-clockwise away from vertical V. Looking at FIG. 8 lighting device 50 is standing on horizontal road HR. Lighting device 50 has orientation indicator OI—which in FIG. 8—is coincident with vertical V. The position angle is the angle between vertical V and orientation indicator OI. For FIG. 8 position one angle P1 is zero. Tilt angle AT is controlled by the design and position of gravity power controller 12 with lighting device 50. Gravity power controller 12 for lighting device 50 is a standard rolling ball gravity switch having a tilt angle AT of about ninety degrees. Also for lighting device 50, tilt angle AT is constant about the azimuth.

There are alternate types of gravity power controllers capable of providing a range of tilt angles as well as tilt angles that change with the azimuth. Looking again at FIG. 8 lighting device 50 will remain "ON" as long as gravity power controller 12 is conducting. Gravity power controller 12 will be conducting (closed circuit) as long as orientation indicator OI is positioned within tilt angle AT or equivalently position one angle P1 is less than tilt angle AT. Since in FIG. 8 position one angle P1 is zero degrees and tilt angle AT is 90 degrees, the schematic of FIG. 6 indicates that electricity will flow from power supply 14 through closed disconnect switch 17 and closed gravity power controller 12 through light source 18 to energize and thereby illuminate light source 18. The light emitted by light source 18 is condensed towards horizontal H1 by optic 19 where upon it passes through transparent window 5 and emerges from lighting device 50. If lighting device 50 is rotated counter-clockwise to position two angle P2 as shown in FIG. 9 orientation indicator OI is exterior to tilt angle AT. This causes gravity power controller 12 to "open circuit" reducing the energy and power supplied to light source 18 to zero and reducing the intensity of light source 18 to zero. Lighting device 50 is now "OFF". If lighting device 50 is rotated counter-clockwise again as shown in FIG. 10 to position three angle P3 orientation indicator OI is again exterior to tilt angle AT causing gravity power controller 12 to remain open and lighting device 50 to remain "OFF". Lighting device 50 stored according to FIG. 10 will be "OFF". Upon being removed from the storage orientation of FIG. 10 and carried according to the transporting orientation of FIG. 11 lighting device 50 will automatically turn "ON". Lighting device 50 changes from dormant dark into a powerful warning beacon protecting the first responder without the first responder having to consciously activate the device. In emergency situations first responders can easily forget to protect themselves. The present invention does that for them.

FIG. 11 shows a transporting orientation for lighting device 50 in which lighting device 50 will be emitting light. This emitted light serves to identify the location of the person carrying lighting device 50 thereby protecting him from being hit by an advancing vehicle. In FIG. 11 lighting device 50 is suspended by lanyard 22 passing through adapter 7. Lanyard 22 is configured into a loop 20 and held at holding location 23. Lanyard 22 can be constructed from a wide variety of materials. It can have numerous shapes and for some uses be rigidly attached to lighting device 50. Lighting device 50 suspended according to FIG. 11 will assume orientation indictor OT at position four angle P4 because vertical one V1 will pass through center of gravity CG of lighting device 50 and holding position 23. Since position four angle is less than tilt angle AT lighting device 50 will—as previously described—according to circuit 9 emit light. Lanyard 22 can be constructed of plastic, leather or any number of materials. Also it can have a contour other than loop 20.

FIG. 12 shows lighting device 50 as it could be used on a vehicle trunk T. FIG. 12 shows lighting device 50 with trunk T in trunk open position TO as well as in trunk closed position TC. Looking at FIG. 12 with trunk T in the trunk open position TO lighting device 50 is attached to trunk T with magnet 8 such that it is at position five angle P5 with orientation indicator IO exterior to tilt angle AT. At this orientation gravity power controller 12 is "open" and lighting device 50 is "OFF" not emitting light. This configuration is desirable for some police cars which should remain covert when trunk T is open. Looking again at FIG. 12 with trunk T now in the storage orientation or trunk closed position TC lighting device 50 remains attached with magnet 8. However since trunk T has been rotated lighting device 50 is now at position six angle P6 with orientation indicator IO exterior to tilt angle AT. At this orientation gravity power controller 12 remains "open" and lighting device 50 remains "OFF". This is as needed as lighting device 50 should be "OFF" when it is being stored.

FIG. 13 is similar to FIG. 12 except in FIG. 13 wedge shaped metal bracket 24 has been securely attached to trunk T to change the orientation of lighting device 50. Looking at FIG. 13 with trunk T in the trunk open position TO lighting device 50 is attached to metal bracket 24 with magnet 8 such that it is at position seven angle P7 less than tilt angle AT with orientation indicator OI within tilt angle AT. At this orientation gravity power controller 12 is "closed" and lighting device 50 is "ON" emitting light. This configuration is desirable for highway patrol police who may need supplementary warning lights because their open trunk often blocks their roof lights. If trunk T is moved to the trunk closed position TC lighting device 50 is positioned at position eight angle P8 with orientation indicator exterior to tilt angle AT. At this orientation gravity power controller 12 is "open" and lighting device 50 is in the desirable "OFF" condition as the trunk closed position TC is a storage position. Lanyard 22 as shown in FIGS. 12 and 13 permits easy removal and lighted transporting of lighting device 50 from the trunk T.

FIG. 14 shows carrier 25 transporting four lighting devices L1, L2, L3 and L4 each similar to lighting device 50 of FIG. 1. Carrier 25 can be designed to hold a quantity of lighting devices different than the four lighting devices shown. In FIG. 14 lighting device L1 is removed from carrier 25 but can be installed by pushing it horizontally into slot one S1. Lighting devices L2, L3 and L4 have slot two S2, slot three S3 and slot four S4 respectively. Carrier 25 transports lighting devices L1 through L4 in a transporting orientation which is the orientation shown in FIG. 8 in which orientation indicator OI of lighting device L1 is parallel to vertical two V2 and therefore illuminating. Carrier 25 is in its transporting orientation whenever it is positioning lighting device L1 such that its position angle is less than its tilt angle AT or equivalently its orientation indicator OI is within its tilt angle AT or equivalently it is "ON". Carrier 25 is in its storage orientation whenever it is positioning lighting device L1 such that it is "OFF". Similarly lighting devices L2, L3 and L4 are nonilluminating. This occurs when the carrier is oriented with the lighting devices each having their orientation indicator exterior to their respective tilt angle AT.

Thus, multiple flares may be placed in a single carrier 25 which is stored with the flares in an inverted position such that all are on the "OFF" mode. The flares are in a non-illuminating mode while in storage thereby conserving energy and extending the life of the batteries. When the responder removes carrier 25 from the storage location (e.g., trunk of auto) the multiple flares are placed in an upright position, such that the flares are all activated and the first responder has no actions to take. The responder is clearly visible while carrying carrier 25 and responder then disposes the individual flares at desired locations. Thus, the present invention provides previously unavailable protection to the first responder.

FIG. 15 is a cross-section of FIG. 14 across line 15-15 and FIG. 16 a cross-section of FIG. 14 across line 16-16'. Looking at FIGS. 14, 15 and 16 carrier 25 comprises carrier top 26 and carrier bottom 27 constructed by stereo lithography of one piece or molded separately as a top and bottom which are subsequently fastened or glued together by conventional means. Carrier 25 can be cast from a variety of resins however if it is cast of a translucent resin it will glow whenever lighting devices L1 through L4 are being transported. If it is cast of a transparent resin the powerful horizontal light emitted from lighting devices L1 through L4 will create a high intensity beacon during transporting. Thus lighting devices L1 through L4 not only serve to indicate a hazard when deployed but also serve to protect the first responder during deployment and retrieval. Carrier 25 includes handle 28 having wings 29 which slide in tracks 30. Handle 28 therefore can move up and down with wings 29 in tracks 30 parallel to vertical two V2. Handle 28 moves from extended distance DE—usually exceeding one inch to provide adequate space for a hand—when carrier 25 is transporting lighting devices L1, L2, L3 and L4 to a storage position with extend distance DE reduced to zero and handle 28 in recess 31 permitting carrier 25 to be flat when positioned upside down on a horizontal surface.

FIG. 15 shows lighting device L1 in slot one S1 located on the side of carrier 25. Lighting device L1 is installed in slot one S1 by pushing it into the side of carrier 25 in the direction of movement arrow MA. Catch 32 is a small mass of plastic molded as an integral part of carrier top 25 to hold lighting device L1 in place in carrier 25 once it is pushed into slot one S1. As lighting device L1 is pushed into slot one S1 window 5 of housing 2 bumps into carrier 25 at catch 32. As lighting device L1 continues to be pushed into slot one S1 window 5 lifts catch 32 so that it can move further into slot one S1. Carrier 25 is designed to permit catch 32 to move upward by comprising a flex location 33 which moves upward as catch 32 is lifted by window 5 of housing 2. As window 5 moves past catch 32 it snaps back to its unstressed location and secures lighting device L1 within carrier 25. Lighting device L1 can easily be removed from carrier 25 by pulling it from the side of carrier 25 thereby once again lifting and passing catch 32 but this time exiting slot one S1. Carrier 25 therefore has a design which is flexible and which permits lighting device L1, to be pushed into slot one S1 to be held securely until it is pulled from slot one S1. Carrier 25 also includes top cut-out 34 and bottom cut-out 35 at slot one S1. These are included to provide a means to grab lighting device L1 when the first responder wishes to pull it from its slot. Top cut-out 34 and bottom cut-out 35 are used so that lighting device L1 can be pinched with two fingers to assure a secure grip. Slot one S1 and top cut-out 34 additionally provide an unobstructed view of window 5 when viewed from the side of carrier 25. This permits a portion of horizontal light beam HB emerging from lighting device L1 to avoid passing through the transparent plastic of carrier 25 and being attenuated.

Carrier 25 also permits lighting device L1 to include lanyard 22 as shown in FIG. 1 to be added to facilitate its removal from slot one S1 of carrier 25.

Also if main switch 6 of lighting device L1 is positioned in slot one S1 at top cut-out 34 lighting device L1 can be activated by that switch while still in carrier 25. Carrier 25 includes similar slot and catch contours for each of the four lighting devices being carried.

FIG. 17 shows carrier 25 holding four lights in a storage position upside down on a horizontal shelf HS. Handle 28 is in storage position so that carrier 25 lies flat and is not inclined to flip over. Lighting devices L1 through L4 are installed in slots S1 through S4 respectively and oriented upside down similar to FIG. 10 and thereby "OFF".

FIG. 18 shows storage bracket 36 holding four lights on horizontal shelf HS. Adhesive or fasteners are used to secure storage bracket bottom 38 to surface 39 the underside of horizontal shelf HS. Lighting devices L1 through L4 are oriented similar to FIG. 10 and thereby "OFF". They can be easily removed or added to storage bracket 36 as previously described in FIGS. 14 and 15. Storage bracket 36 is identical to carrier 25 with handle 28 removed.

FIG. 19 is a schematic of an alternate circuit configuration which could be used in place of the FIG. 6 design. In FIG. 19 power supply 14, light source 18, main switch 6, gravity power controller 12 and flasher module 37 are all in series. With this circuit configuration lighting device 50 will turn "ON-OFF" with main switch 6 if gravity power controller 12 is "closed" as shown. However, even if main switch 6 of lighting device 50 is "ON" it can be turned "OFF" if gravity power controller 12 is open circuited. Thus if main switch 6 is "OFF" then lighting device 50 is always "OFF". If main switch 6 is "ON" then it remains "ON" as long as gravity power controller 12 is also "ON" but turns "OFF" if gravity power controller 12 is "OFF". If optional disable switch 17 is in the open circuit position as shown it has no operational effect. If it is "closed" it disables gravity power controller 12. Flasher module 37 is a typical commercial flasher which pulses the light emerging from lighting device 50.

FIG. 20 is a schematic of a second alternate circuit which can replace the FIG. 6 circuit of lighting device 50. The circuit of FIG. 20 will function solely based upon its angular orientation and its "ON-OFF" is controlled only by gravity power controller 12. This design is economical and acceptable for some uses. In addition in eliminating main switch 6 it improves the reliability of lighting device 50. It is however limited in its use as there are situations in which gravity control is unacceptable.

FIG. 21 is an assembly view of carrier 25 from FIG. 14. It shows carrier 25 assembled from molded components and having carrier top 26 attached to carrier bottom 27 with six self threading screws 40. Handle 28 wings 29 upon being spread snap into tracks 30 on carrier bottom 27.

FIG. 22 is a perspective view of carrier bottom 27 removed from FIG. 21 and showing cavities partially forming slots S1 through S4 the contour of each made to accommodate the shape of the lighting device to be held.

The preferred embodiment of the present invention is a lighting device in a compact, rugged housing which has a light source, an electrical circuit, a source of power and a gravity controller. The device has a low center of gravity. The device is energized when oriented within a selected tilt angle with respect to the vertical. When energized with its orientation indicator vertically positioned, a beam of light is generated in a horizontal plane. When placed in a storage orientation, the light source is automatically de-energized and when rotated and removed from the storage orientation for use, the light source is automatically energized. A storage bracket for a plurality of lighting devices permits easy removal of the lighting devices when needed. A disable switch overrides the gravity controller to provide greater versatility to the device.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A portable lighting system comprising:
a plurality of portable lighting devices;
each lighting device of said plurality of portable lighting devices including a housing and a circuit attached to said housing, said circuit including a light source, a source of electric power and a gravity power controller, if said lighting device is positioned at a transporting orientation with an orientation indicator of said lighting device within a tilt angle, said gravity power controller is configured to energize said light source from said source of electric power, said tilt angle is an orientation of said lighting device having a magnitude relative to a vertical, said gravity power controller is configured to de-energize said light source if said lighting device is positioned at a storage orientation with said orientation indicator outside said tilt angle; and
a storage bracket for mounting on a surface of a vehicle and for holding each of said plurality of lighting devices at said storage orientation, wherein each of said lighting devices is configured to remain de-energized as long as said orientation indicator for each said lighting device remains outside said tilt angle, wherein said storage bracket is constructed of a substantially translucent material for transmitting light emitted from said plurality of lighting devices when said plurality of lighting devices are positioned at the transporting orientation.

2. A portable lighting device according to claim 1 wherein, said circuit further comprising a main switch for connecting said light source to said gravity power controller.

3. A portable lighting system according to claim 1 wherein, said storage bracket has a slot for holding each of said plurality of lighting devices and for passing light emitted from each of said plurality of lighting devices unattenuated through said storage bracket.

4. A portable lighting system according to claim 1 wherein, each of said plurality of lighting devices has a slot on a side of said storage bracket for holding said lighting device, said slot having a cut-out for facilitating removal of said lighting device from said slot.

5. A portable lighting system comprising:
a plurality of portable lighting devices;
each lighting device of said plurality of portable lighting devices including a housing and a circuit attached to said housing, said circuit including a light source, a source of electric power and a gravity power controller, said gravity power controller configured to energize said light source to emit a light if said lighting device being at a transporting orientation having an orientation indicator of said lighting device within a tilt angle, said tilt angle is an orientation of said lighting device having a magnitude relative to a vertical, if said lighting device being at a storage orientation having said orientation indicator outside said tilt angle said gravity power controller configured to de-energize said light source; and
a carrier for transporting and storing said plurality of lighting devices, said carrier having a first orientation wherein each of said lighting devices is configured to be held so that said orientation indicator of each of said lighting devices is within said tilt angle, said carrier additionally having a second orientation wherein each of said lighting devices is configured to be held with said orientation indicator outside said tilt angle and each of the lighting devices configured to be de-energized, whereby each of said lighting devices remains de-energized as long as said orientation indicator remains outside said tilt angle, wherein said carrier is constructed of a substantially translucent material whereby if said carrier is at said first orientation said carrier is configured to glow due to the light emitted from said plurality of lighting devices.

6. A portable lighting system according to claim 5 wherein, said circuit for each of said lighting devices further comprises a main switch for connecting said light source to said gravity power controller.

7. A portable lighting system according to claim 5 wherein, said carrier further comprises a plurality of slots, each of said plurality of slots for holding one of said plurality of lighting devices and for passing the light from said lighting device unattenuated through said carrier, said slot having a cut-out for facilitating removal of said lighting device from said carrier.

8. A portable lighting system according to claim 5 wherein, said carrier further comprises a plurality of slots, each of said plurality of slots for holding one of said plurality of lighting devices, said slot having a cut-out for facilitating removal of said lighting device from said carrier.

9. A portable lighting system comprising:
a plurality of portable lighting devices;
each of said lighting devices including a housing and a circuit attached to said housing, said circuit including a light source, a source of electric power and a gravity power controller, said gravity power controller configured to energize said light source to emit a light, if said lighting device is at a transporting orientation having an orientation indicator of said lighting device within a tilt angle, said tilt angle is an orientation of said lighting device having a magnitude relative to a vertical, if said lighting device is at a storage orientation said lighting device having said orientation indicator outside said tilt angle and said gravity power controller configured to de-energize said light source; and
a light passing carrier for transporting and storing said plurality of lighting devices, said light passing carrier having a first orientation configured to hold each of said lighting devices such that said orientation indicator of said lighting devices is outside said tilt angle, and said lighting device is configured to be extinguished, said light passing carrier having a second orientation configured to hold each of said lighting devices such that said orientation indicator of said lighting device is within said tilt angle and are configured to emit light, whereby each of said lighting devices is configured to remain energized within said light passing carrier as long as said orientation indicator is within said tilt angle, wherein said carrier is constructed of a substantially transparent material for passing the light emitted from said plurality of lighting devices through said light passing carrier when said light passing carrier is positioned at the second orientation.

10. A portable lighting system according to claim 9 wherein,
said light passing carrier has a plurality of slots, each of said slots for holding one of said lighting devices and for passing the light from said lighting device unattenuated through said light passing carrier, said slot having a cut-out for facilitating removal of said lighting device from said light passing carrier.

11. A portable lighting system according to claim 9 wherein,
said carrier configured to be flat when in said first orientation upside down on a horizontal surface.

12. A portable lighting system according to claim 9 wherein,
said light passing carrier has a plurality of slots, each of said slots for holding one of said lighting devices in said second orientation, and at said second orientation said light passing carrier is configured to facilitate installing each said lighting device with a horizontal push.

13. A portable lighting system according to claim 9 wherein,
said lighting system is configured for storage in a vehicle whereby providing illumination at said vehicle will reduce accidents.

14. A portable lighting system according to claim 9 wherein,
said light passing carrier is configured for simultaneous activation of said plurality of lighting devices upon a rotation of said carrier from said first orientation to said second orientation.

\* \* \* \* \*